United States Patent
Baldi et al.

(10) Patent No.: US 12,417,420 B1
(45) Date of Patent: Sep. 16, 2025

(54) SCENARIO PLANNING SOLUTIONS

(71) Applicant: Blue Yonder Group, Inc., Scottsdale, AZ (US)

(72) Inventors: Pradeep Baldi, Irving, TX (US); Mathieu Linder, Dallas, TX (US); Joerg Beringer, Redwood City, CA (US); Anton Vonorych, Ternopil (UA)

(73) Assignee: Blue Yonder Group, Inc., Scottsdale, AZ (US)

( * ) Notice: Subject to any disclaimer, the term of this patent is extended or adjusted under 35 U.S.C. 154(b) by 392 days.

(21) Appl. No.: 18/102,346

(22) Filed: Jan. 27, 2023

Related U.S. Application Data

(60) Provisional application No. 63/344,892, filed on May 23, 2022.

(51) Int. Cl.
*G06Q 10/087* (2023.01)
*G06Q 10/0631* (2023.01)

(52) U.S. Cl.
CPC ..... *G06Q 10/06315* (2013.01); *G06Q 10/087* (2013.01)

(58) Field of Classification Search
CPC ............... G06Q 10/06315; G06Q 10/087
USPC .................................................. 705/28
See application file for complete search history.

(56) References Cited

U.S. PATENT DOCUMENTS

| | | | | |
|---|---|---|---|---|
| 7,499,766 B2 * | 3/2009 | Knight | ................. | G06Q 10/087 |
| | | | | 700/107 |
| 2023/0385729 A1 * | 11/2023 | Moisan | ................... | A61P 35/00 |

* cited by examiner

*Primary Examiner* — Garcia Ade
(74) *Attorney, Agent, or Firm* — Spencer Fane LLP; Steven J. Laureanti

(57) ABSTRACT

A system and method are disclosed for performing rough cut capacity planning. The method includes receiving supply chain transaction data as transaction tables, generating a base plan and generating updated transaction tables, denormalizing the base plan and the updated transaction tables, generating supply chain network flow paths and supply chain network data, solving a rough cut capacity planning problem based at least in part on the supply chain network flow paths, the supply chain network data and simulation data, repeating at least the generating and solving until business goals of the rough cut capacity planning meet a threshold, and updating the simulation data based on an upsert process. The method further includes relaxing supply chain network constraints, inverting the supply chain network, and traversing a perturbation in the supply chain network constraints as demands in a reverse direction towards customer nodes.

20 Claims, 13 Drawing Sheets

700

| Levels_To_Ask | Num_Simulatirons | Time_Taken (MilliSec) |
|---|---|---|
| 1 | 1 | 4.03404235 |
| 1 | 5 | 5.68199157 |
| 1 | 10 | 10.094165 |
| 1 | 50 | 35.8228683 |
| 1 | 100 | 46.2689399 |
| 1 | 1000 | 232.758045 |
| 2 | 1 | 1.91521644 |
| 2 | 5 | 2.38418579 |
| 2 | 10 | 5.02490997 |
| 2 | 50 | 14.6591663 |
| 2 | 100 | 31.1381816 |
| 2 | 1000 | 228.410720 |
| 4 | 1 | 2.55513191 |
| 4 | 5 | 4.59599494 |
| 4 | 10 | 16.3147449 |
| 4 | 50 | 53.7278652 |
| 4 | 100 | 90.7988548 |
| 4 | 1000 | 865.592002 |
| 8 | 1 | 4.35566902 |
| 8 | 5 | 13.1320953 |
| 8 | 10 | 49.3021011 |
| 8 | 50 | 121.376991 |
| 8 | 100 | 218.226194 |
| 8 | 1000 | 2456.41207 |
| 16 | 1 | 4.80103492 |
| 16 | 5 | 23.3850479 |
| 16 | 10 | 35.7379913 |
| 16 | 50 | 116.266012 |
| 16 | 100 | 182.982921 |
| 16 | 1000 | 2028.40590 |

| TYPE | NAME | QUANTITY | UNIT_COST | LEAD_TIME | DATE | LEVEL |
|---|---|---|---|---|---|---|
| NODE | R18276W@1103 | 41.8486 | -1.000 | 0 | 2022-07-04 | 4 |
| EDGE | (R18276W@1381, R18276W@1103) | 41.8487 | 12.000 | 0 | 2022-07-04 | 4 |
| EDGE | (05560802@1381, R18276W@1381) | 168.9997 | 0.000 | 0 | 2022-07-04 | 3 |
| EDGE | (05560802@1381, R40024C@1381) | 168.9997 | 0.000 | 0 | 2022-07-04 | 3 |
| EDGE | (05560802@1381, R40291C@1381) | 168.9997 | 0.000 | 0 | 2022-07-04 | 3 |
| NODE | R51133K@1103 | 168.9995 | -1.000 | 0 | 2022-07-04 | 4 |
| EDGE | (R51133K@1381, R51133K@1103) | 168.9996 | 12.000 | 0 | 2022-07-04 | 4 |
| EDGE | (05560802@1381, R51133K@1381) | 168.9997 | 0.000 | 0 | 2022-07-04 | 3 |
| EDGE | (05560802@1381, R40258A@1381) | 168.9997 | 0.000 | 0 | 2022-07-04 | 3 |
| EDGE | (05560802@1381, R53182G@1381) | 168.9997 | 0.000 | 0 | 2022-07-04 | 3 |
| EDGE | (05560802150@1381, 05560802@1381) | 168.9998 | 151.190 | 0 | 2022-07-04 | 2 |

FIG. 9

| | Current Plan | Scenario 1 (Recommended) | Scenario 2 | Scenario 3 |
|---|---|---|---|---|
| Revenue | $8b ▲ 14% | $8.1b ▲ 14.5% | $9.3b ▲ 21.3% | $9.3b ▲ 21.3% |
| Gross Profit Margin | 15.7% ▲ 1.1% | 15.9% ▲ 1.2% | 17.5% ▲ 3.57% | 17.5% ▲ 3.57% |
| Cost to Serve | $5.5b ▼ 7% | $5.5b ▼ 7% | $5.7b ▼ 7.4% | $5.7b ▼ 7.4% |
| Service Level | 93% ▲ 3% | 93% ▲ 3% | 95% ▲ 3.54% | 95% ▲ 3.54% |
| | | Accept | Accept | Accept |

FIG. 11

SCENARIO PLANNING SOLUTIONS

CROSS-REFERENCE TO RELATED APPLICATIONS

The present disclosure is related to that disclosed in the U.S. Provisional Application No. 63/344,892, filed May 23, 2022, entitled "Scenario Planning Solutions." U.S. Provisional Application No. 63/344,892 is assigned to the assignee of the present application. The present invention hereby claims priority under 35 U.S.C. § 119(e) to U.S. Provisional Application No. 63/344,892.

TECHNICAL FIELD

The present disclosure relates generally to supply chain planning, and more in particular relates to scenario planning solutions.

BACKGROUND

Existing scenario planning solutions lack the ability to quickly generate multiple risk and/or reward perspectives to support supply chain decision making. These scenario planning solutions also lack practical user interface workflows that are needed to evaluate business trade-offs associated with different scenarios. In addition, these scenario planning solutions lack the ability to generate multiple point of views in order to support timely decision making. Furthermore, existing scenario planning solutions involve numerous manual inputs across multiple screens which makes their use a time consuming process prone to errors. Other shortcomings of existing scenario planning solutions is that they require tacit knowledge by someone who is configuring or building a scenario. That is, a user that is unable to set the right thresholds and the right parameters, can never achieve the desired output. Furthermore, it is not possible to orchestrate a scenario that spans across multiple solution areas and business processes, using existing scenario planning solutions. Lastly, if using cloud computing infrastructure to execute existing scenario planning solutions, the cost of evaluating scenarios may prohibitive from a business standpoint. Thus, existing scenario planning solutions are inflexible, time consuming, prone to errors, require expert knowledge to operate and may be prohibitively expensive to use, all of which is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIG. 7 illustrates performance data of the RCCP method of FIG. 3, according to an embodiment;

FIG. 9 illustrates an example chart of RCCP data, according to an embodiment;

FIG. 11 illustrates a first user interface, according to an embodiment;

DETAILED DESCRIPTION

Figure 1:
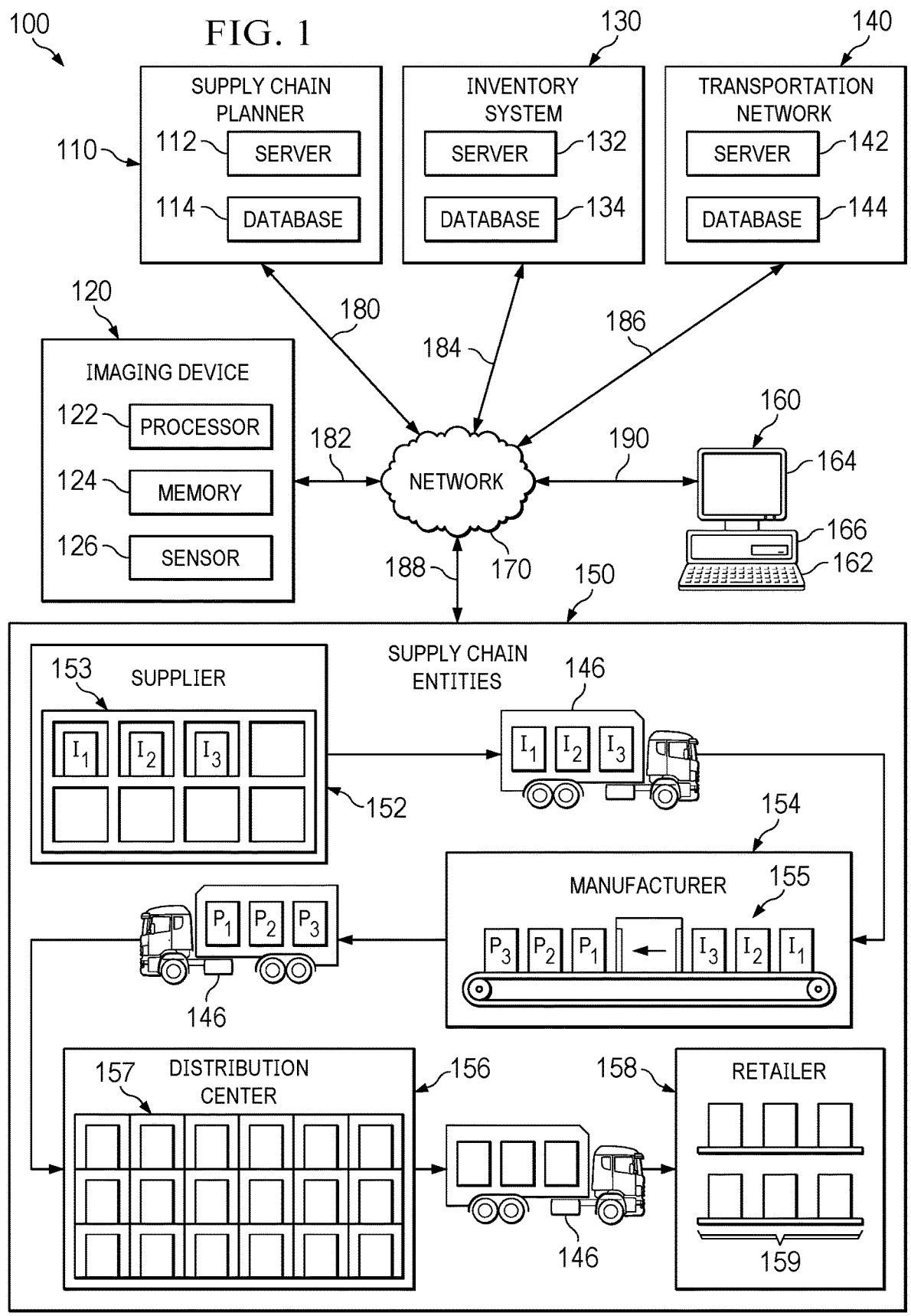
FIG. 1 illustrates a supply chain network, according to an embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described in more detail below, embodiments of the following disclosure provide a low-touch decision support framework to provide the best input variable values from among all possibilities without explicitly evaluating each possibility using simulation optimization for a fixed time or iterations using a combination of stochastic and heuristics techniques. According to embodiments, a simulation iteration is a test or a series of tests in which meaningful changes are made to the input variables so that we may observe and identify the reasons for changes to the output variable(s) or goals and then iteratively refine the set of input variables to get us closer to the goals.

Embodiments, provide for a test of multiple input variables in order to observe and identify the change that their effect has on output variables or business goals. In addition, embodiments then iterate through them until they get closer to the business goals. That is, instead of asking users to provide definite inputs, embodiments look to the intent. Use of embodiments may reduce the computational costs of executing supply chain scenario panning. In addition, or as an alternative, use of embodiments ensures that a simulation experiment does not become computationally prohibitive from a cost standpoint.

According to embodiments and for supply chain planning applications, there are two broad categories of scenarios: 1) perturbation demand and the ability to see its impact on the network and 2) perturbation network parameters and the ability to see its impact on the demand. Typical supply chain solving techniques involve traversing the end customer demand up the network through various fulfillment stages and related constraints to meet a set of business objectives. This technique is better suited for demand perturbation-based scenarios and requires checking multiple levels of constraints across the supply chain network which could get very complex and computationally intensive. Through simulation-optimization, embodiments combine fast and iterative simulations with optimization goals to evaluate thousands of perturbations within a shorter time period than existing scenario planning solutions. Embodiments provide the ability to invert the network and identify a constraint that may be used as input while demand becomes the output. That is, embodiments traverse the network in a reverse way, that allows for the ability to respect the constraints without explicitly accounting for them. Embodiments provide for this to be achieved by relaxing the network constraints, inverting the network, and traversing the perturbation in network constraints as demands in the reverse direction toward the customer nodes.

FIG. 1 illustrates supply chain network 100, in accordance with a first embodiment. Supply chain network 100 comprises supply chain planner 110, inventory system 120, transportation management system 130, one or more imaging devices 140, one or more supply chain entities 150, one or more computers 160, network 170, and one or more communication links 180-190. Although a single supply chain planner 110, a single inventory system 120, a single transportation management system 130, one or more imaging devices 140, one or more supply chain entities 150, one or more computers 160, and a single network 170 are shown and described, embodiments contemplate any number of supply chain planners, inventory systems, transportation management systems, imaging devices, supply chain entities, computers, or networks, according to particular needs.

In one embodiment, supply chain planner 110 comprises server 112 and database 114. Server 112 comprises one or more modules that model, generate, and solve a supply chain planning problem. As described in more detail below, supply chain planner 110 may model a supply chain planning problem and calculate a solution using one or more solvers, such as, for example, a Deep Tree solver, a MAP solver, an LP optimization solver, and the like. By way of example only and not by way of limitation, supply chain planner 110 may model a supply chain planning problem as a multi-objective hierarchical linear programming (LP) problem comprising an LP constraint-variable matrix and calculate the globally-optimal LP solution to the supply chain planning problem. Other embodiments of supply chain planner model a supply chain planning problem for solving by a Deep Tree solver, MAP solver, and other like planning problem solvers.

Inventory system 120 comprises server 122 and database 124. Server 122 of inventory system 120 is configured to receive and transmit product data 216 (see FIG. 2) (including, for example, item identifiers, pricing data, and attribute data), inventory data 220 (see FIG. 2) (including, for example, inventory levels), and other like data about one or more items at one or more locations in supply chain network 100. Server 122 stores and retrieves data about the one or more items from database 124 or from one or more locations in supply chain network 100.

Transportation management system 130 comprises server 132 and database 134. According to embodiments, transportation management system 130 directs the one or more transportation vehicles 136 to ship one or more items between one or more supply chain entities 150, based, at least in part, on the number of items currently in transit in transportation management system 130, a supply chain plan, such as, for example, a supply chain master plan, the number of items currently in stock at one or more supply chain entities 150, a forecasted demand, a supply chain disruption, a material or capacity reallocation, current and projected inventory levels at one or more stocking locations, and/or one or more additional factors described herein. One or more transportation vehicles 136 comprise, for example, any number of trucks, cars, vans, boats, airplanes, unmanned aerial vehicles (UAVs), cranes, robotic machinery, or the like. One or more transportation vehicles 136 may comprise radio, satellite, or other communication that communicates location information (such as, for example, geographic coordinates, distance from a location, global positioning satellite (GPS) information, or the like) with supply chain planner 110, inventory system 120, transportation management system 130, one or more imaging devices 140, and/or one or more supply chain entities 150 to identify the location of one or more transportation vehicles 136 and the location of an item of any inventory or shipment located on one or more transportation vehicles 136.

One or more imaging devices 140 comprise one or more processors 142, memory 144, one or more sensors 146, and may include any suitable input device, output device, fixed or removable computer-readable storage media, or the like. According to embodiments, one or more imaging devices 140 comprise an electronic device that receives data from one or more sensors 146. One or more sensors 146 of one or more imaging devices 140 may comprise an imaging sensor, such as, a camera, scanner, electronic eye, photodiode, charged coupled device (CCD), or any other electronic component that detects visual characteristics (such as color, shape, size, fill level, or the like) of objects. One or more imaging devices 140 may comprise, for example, a mobile handheld electronic device such as, for example, a smartphone, a tablet computer, a wireless communication device, and/or one or more networked electronic devices configured to image items using one or more sensors 146 and transmit product images to one or more databases.

In addition, or as an alternative, one or more sensors 146 may comprise a radio receiver and/or transmitter configured to read from and/or write to an electronic tag, such as, for example, a radio-frequency identification (RFID) tag. Each item may be represented in supply chain network 100 by an identifier, including, for example, Stock-Keeping Unit (SKU), Universal Product Code (UPC), serial number, barcode, tag, RFID, or like device that encodes identifying information. One or more imaging devices 140 may generate a mapping of one or more items in supply chain network 100 by scanning an identifier or device associated with an item and identifying the item based, at least in part, on the scan. This may include, for example, a stationary scanner located at one or more supply chain entities 150 that scans items as the items pass near the scanner. As explained in more detail below, supply chain planner 110, inventory system 120, transportation management system 130, and one or more imaging devices 140 may use the mapping of an item to locate the item in supply chain network 100. The location of the item may be used to coordinate the storage and transportation of items in supply chain network 100 according to one or more plans generated by supply chain planner 110 and/or a reallocation of materials or capacity. Plans may comprise one or more of a master supply chain plan, production plan, distribution plan, and the like.

Additionally, one or more sensors 146 of one or more imaging devices 140 may be located at one or more locations local to, or remote from, one or more imaging devices 140, including, for example, one or more sensors 146 integrated into one or more imaging devices 140 or one or more sensors 146 remotely located from, but communicatively coupled with, one or more imaging devices 140. According to some embodiments, one or more sensors 146 may be configured to communicate directly or indirectly with one or more of supply chain planner 110, inventory system 120, transportation management system 130, one or more imaging devices 140, one or more supply chain entities 150, one or more computers 160, and/or network 170 using the one or more communication links 180-190.

As shown in FIG. 1, supply chain network 100 comprising supply chain planner 110, inventory system 120, transportation management system 130, one or more imaging devices 140, and one or more supply chain entities 150 may operate on one or more computers 160 that are integral to or separate from the hardware and/or software that support supply chain planner 110, inventory system 120, transportation management system 130, one or more imaging devices 140, and one or more supply chain entities 150. One or more computers 160 may include any suitable input device 162, such as a keypad, mouse, touch screen, microphone, or other device to input information. Output device 164 may convey information associated with the operation of supply chain network 100, including digital or analog data, visual information, or audio information.

One or more computers 160 may include fixed or removable computer-readable storage media, including a non-transitory computer-readable medium, magnetic computer disks, flash drives, CD-ROM, in-memory device or other suitable media to receive output from and provide input to supply chain network 100. One or more computers 160 may include one or more processors 166 and associated memory to execute instructions and manipulate information according to the operation of supply chain network 100 and any of the methods described herein. In addition, or as an alternative, embodiments contemplate executing the instructions on one or more computers 160 that cause one or more computers 160 to perform functions of the method. An apparatus implementing special purpose logic circuitry, for example, one or more field programmable gate arrays (FPGA) or application-specific integrated circuits (ASIC), may perform functions of the methods described herein. Further examples may also include articles of manufacture including tangible non-transitory computer-readable media that have computer-readable instructions encoded thereon, and the instructions may comprise instructions to perform functions of the methods described herein.

Supply chain planner 110, inventory system 120, transportation management system 130, one or more imaging devices 140, and one or more supply chain entities 150 may each operate on one or more separate computers 160, a network of one or more separate or collective computers 160, or may operate on one or more shared computers 160. In addition, supply chain network 100 may comprise a cloud-based computing system having processing and storage devices at one or more locations local to, or remote from, supply chain planner 110, inventory system 120, transportation management system 130, one or more imaging devices 140, and one or more supply chain entities 150. In addition, each of one or more computers 160 may be a work station, personal computer (PC), network computer, notebook computer, tablet, personal digital assistant (PDA), cell phone, telephone, smartphone, mobile device, wireless data port, augmented or virtual reality headset, or any other suitable computing device. In an embodiment, one or more users may be associated with supply chain planner 110, inventory system 120, transportation management system 130, one or more imaging devices 140, and one or more supply chain entities 150. These one or more users may include, for example, a "manager" or a "planner" handling supply chain planning and/or one or more related tasks within supply chain network 100. In addition, or as an alternative, these one or more users within supply chain network 100 may include, for example, one or more computers 160 programmed to autonomously handle, among other things, production planning, demand planning, option planning, sales and operations planning, supply chain master planning, plan adjustment after supply chain disruptions, order placement, automated warehouse operations (including removing items from and placing items in inventory), robotic production machinery (including producing items), and/or one or more related tasks within supply chain network 100.

One or more supply chain entities 150 may represent one or more suppliers 152, manufacturers 154, distribution centers 156, and retailers 158 of supply chain network 100 or one or more supply chain networks 100, including one or more enterprises. One or more suppliers 152 may be any suitable entity that offers to sell or otherwise provides one or more components to one or more manufacturers 154. One or more suppliers 152 may, for example, receive a product from a first supply chain entity in supply chain network 100 and provide the product to another supply chain entity. One or more suppliers 152 may comprise automated distribution systems 153 that automatically transport products to one or more manufacturers 154 based, at least in part, on the number of items currently in transit in transportation management system 130, a supply chain plan, the number of items currently in stock at one or more supply chain entities 150, a forecasted demand, a supply chain disruption, a material or capacity reallocation, current and projected inventory levels at one or more stocking locations, and/or one or more additional factors described herein.

One or more manufacturers 154 may be any suitable entity that manufactures at least one product. One or more manufacturers 154 may use one or more items during the manufacturing process to produce any manufactured, fabricated, assembled, or otherwise processed item, material, component, good or product. Items may comprise, for example, components, materials, products, parts, supplies, or other items, that may be used to produce products. In addition, or as an alternative, an item may comprise a supply or resource that is used to manufacture the item, but does not become a part of the item. In one embodiment, a product represents an item ready to be supplied to, for example, another supply chain entity, an item that needs further processing, or any other item. One or more manufacturers 154 may, for example, produce and sell a product to one or more suppliers 152, another one or more manufacturers 154, one or more distribution centers 156, one or more retailers 158, or any other suitable customer or one or more supply chain entities 150. One or more manufacturers 154 may comprise automated robotic production machinery 155 that produce products based, at least in part, on the number of items currently in transit in transportation management system 130, a supply chain plan, the number of items currently in stock at one or more supply chain entities 150, a forecasted demand, a supply chain disruption, a material or capacity reallocation, current and projected inventory levels at one or more stocking locations, and/or one or more additional factors described herein.

One or more distribution centers 156 may be any suitable entity that offers to sell or otherwise distributes at least one product to one or more retailers 158, customers, or any suitable one or more supply chain entities 150. One or more distribution centers 156 may, for example, receive a product from a first supply chain entity in supply chain network 100 and store and transport the product for a second supply chain entity. One or more distribution centers 156 may comprise automated warehousing systems 157 that automatically transport an item to, remove an item from, or place an item into inventory of one or more retailers 158, customers, or one or more supply chain entities 150 based, at least in part, on the number of items currently in transit in transportation management system 130, a supply chain plan, the number of items currently in stock at one or more supply chain entities 150, a forecasted demand, a supply chain disruption, a material or capacity reallocation, current and projected inventory levels at one or more stocking locations, and/or one or more additional factors described herein.

One or more retailers 158 may be any suitable entity that obtains one or more products to sell to one or more customers. In addition, one or more retailers 158 may sell, store, and supply one or more components and/or repair a product with one or more components. One or more retailers 158 may comprise any online or brick and mortar location, including locations with shelving systems 159. Shelving systems 159 may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of one or more retailers based on computer-generated instructions or automatically by machinery to place products in a desired location, and which may be based, at least in part, on the number of items currently in transit in transportation management system 130, a supply chain plan, the number of items currently in stock at one or more supply chain entities 150, a forecasted demand, a supply chain disruption, a material or capacity reallocation, current and projected inventory levels at one or more stocking locations, and/or one or more additional factors described herein.

Although one or more suppliers 152, manufacturers 154, distribution centers 156, and retailers 158 are shown and described as separate and distinct entities, the same entity may simultaneously act as any the one or more suppliers 152, manufacturers 154, distribution centers 156, and retailers 158. For example, one or more manufacturers 154 acting as a manufacturer could produce a product, and the same entity could act as one or more suppliers 158 to supply a product to another one or more supply chain entities 150. Although one example of supply chain network 100 is shown and described, embodiments contemplate any configuration of supply chain network 100, without departing from the scope of the present disclosure.

In one embodiment, supply chain planner 110 may be coupled with network 170 using communication link 180, which may be any wireline, wireless, or other link suitable to support data communications between supply chain planner 110 and network 170 during operation of supply chain network 100. Inventory system 120 may be coupled with network 170 using communication link 182, which may be any wireline, wireless, or other link suitable to support data communications between inventory system 120 and network 170 during operation of supply chain network 100. Transportation management system 130 may be coupled with network 170 using communication link 184, which may be any wireline, wireless, or other link suitable to support data communications between transportation management system 130 and network 170 during operation of supply chain network 100. One or more imaging devices 140 are coupled with network 170 using communication link 186, which may be any wireline, wireless, or other link suitable to support data communications between one or more imaging devices 140 and network 170 during operation of supply chain network 100. One or more supply chain entities 150 may be coupled with network 170 using communication link 188, which may be any wireline, wireless, or other link suitable to support data communications between one or more supply chain entities 150 and network 170 during operation of supply chain network 100. One or more computers 160 may be coupled with network 170 using communication link 190, which may be any wireline, wireless, or other link suitable to support data communications between one or more computers 160 and network 170 during operation of supply chain network 100. Although one or more communication links 180-190 are shown as generally coupling supply chain planner 110, inventory system 120, transportation management system 130, one or more imaging devices 140, one or more supply chain entities 150, and one or more computers 160 to network 170, each of supply chain planner 110, inventory system 120, transportation management system 130, one or more imaging devices 140, one or more supply chain entities 150, and one or more computers 160 may communicate directly with each other, according to particular needs.

In another embodiment, network 170 includes the Internet and any appropriate local area networks (LANs), metropolitan area networks (MANs), or wide area networks (WANs) coupling supply chain planner 110, inventory system 120, transportation management system 130, one or more imaging devices 140, one or more supply chain entities 150, and one or more computers 160. For example, data may be maintained local to, or external of, supply chain planner 110, inventory system 120, transportation management system 130, one or more imaging devices 140, one or more supply chain entities 150, and one or more computers 160 and made available to one or more associated users of supply chain planner 110, inventory system 120, transportation management system 130, one or more imaging devices 140, one or more supply chain entities 150, and one or more computers 160 using network 170 or in any other appropriate manner. For example, data may be maintained in a cloud database at one or more locations external to supply chain planner 110, inventory system 120, transportation management system 130, one or more imaging devices 140, one or more supply chain entities 150, and one or more computers 160 and made available to one or more associated users of supply chain planner 110, inventory system 120, transportation management system 130, one or more imaging devices 140, one or more supply chain entities 150, and one or more computers 160 using the cloud or in any other appropriate manner. Those skilled in the art will recognize that the complete structure and operation of network 170 and other components within supply chain network 100 are not depicted or described. Embodiments may be employed in conjunction with known communications networks and other components.

Figure 2:
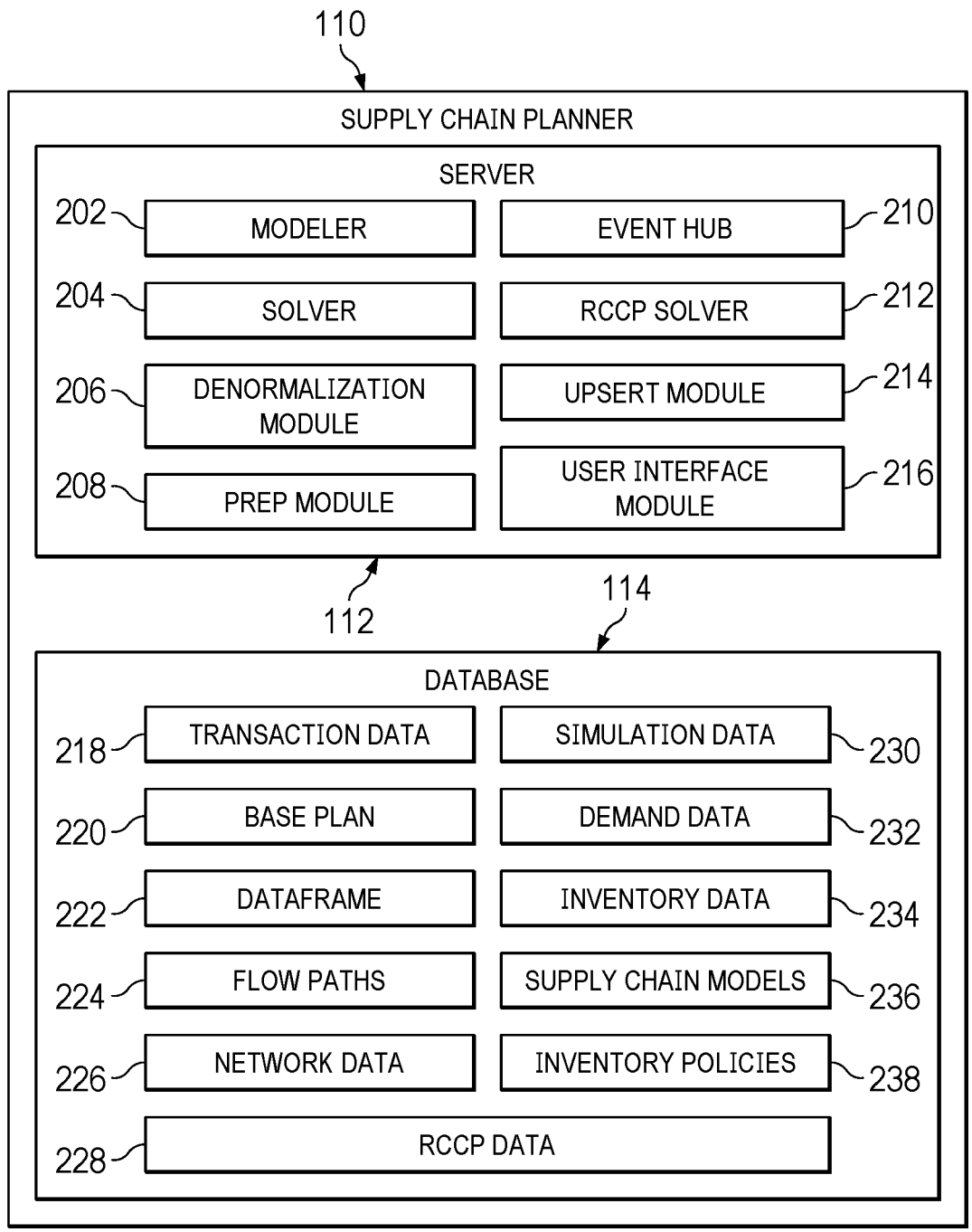
FIG. 2 illustrates the supply chain planner of FIG. 1 in greater detail, according to an embodiment.

FIG. 2 illustrates supply chain planner 110 of FIG. 1 in greater detail, in accordance with an embodiment. As discussed above, supply chain planner 110 comprises server 112 and database 114. Although supply chain planner 110 is shown as comprising a single server 112 and a single database 114, embodiments contemplate any suitable number of servers or databases internal to, or externally coupled with, supply chain planner 110.

Server 112 of supply chain planner 110 may comprise modeler 202, solver 204, denormalization module 206, simulation listener 208, event hub 210, RCCP solver 212, upsert module 214, and user interface module 216. Although server 112 is shown and described as comprising a single modeler 202 a single solver 204, a single denormalization module 206, a single prep module 208, a single event hub 210, a single RCCP solver 212, a single upsert module 214, and a single user interface module 216, embodiments contemplate any number of combination of modelers, solvers, denormalization modules, simulation listeners, event hubs, RCCP solvers, upsert modules, and user interface modules at one or more locations, local to, or remote from supply chain planner 110, at one or more servers 112 or one or more computers 160 at any location in supply chain network 100.

Modeler 202 may model one or more supply chain planning problems of supply chain network 100. According to embodiments, modeler 202 identifies resources, operations, buffers, and pathways, and maps supply chain network 100 as data models. For example, when using an LP solver, modeler 202 models a single- or multi-period supply chain planning problem that represents supply chain network 100 as a hierarchical multi-objective LP supply chain master planning problem comprising mathematical objective functions that represent business objectives, mathematical constraints that represent supply chain constraints, and lower and/or upper bounds on decision variables representing the supply chain data.

Solver 204 comprises generates a solution to the supply chain planning problem using data from one or more of the supply chain data models. Solver 204 of server 112 comprises one or more optimization, heuristic, or mathematical solvers that utilize the data models to generate a solution to the supply chain planning problem. The solutions produced by solver 204 may be called a supply chain plan or base plan 220, according to embodiments.

Denormalization module 206 performs denormalization on transaction data 218, such as transaction tables associated with a base supply chain plan as generated by solver 204. For example, denormalization may be performed by adding redundant data to transaction data 218 in order to improve the read performance of transaction data 218. In embodiments, transaction data 218 may have been previously normalized by a module of supply chain planner 110 configured to normalize data associated with supply chain plans. In embodiments, denormalizing transaction data 218 may be considered preparation for a rough cut capacity planning (RCCP) process.

Prep module 208 performs various preparatory tasks in order to allow RCCP solver 212 to solve an RCCP problem. For example, may generate dataframe 222 from denormalized transaction data 218. Prep module 208 may then use dataframe 222 to determine flow paths 224 and network data 226. As described in further detail below, network data 226 may comprise a network of nodes representing supply chain network 100, and flow paths 224 may include single paths from consumer to upstream nodes of network data 226. Prep module 208 also includes a simulation listener, which continuously listens for simulation data 230 received from event hub 210. Prep module 208 may then combine flow paths 224 with simulation data 230 to generate simulations for RCCP solver 212 to solve.

Event hub 210 oversees the actions of prep module 208, RCCP solver 2121 and upsert module 214, in order to correlate their outputs and feedback their output to iteratively improve the simulation process. For example, event hub 210 may receive flow paths 224 including network data 225 and simulation data 230 from prep module 208, RCCP data 228 from RCCP solver 212 and upsert data from upsert module 214. Event hub 210 may then combine the various data streams from prep module 208, RCCP solver 212 and upsert module 214 to generate simulation data 230. Simulation data 230 may then be provided to a simulation listener associated with prep module 208, in order for simulation data 230 to be used in performing simulations solved by RCCP solver 212.

RCCP solver 212 uses various serverless RCCP functions to perform an RCCP analysis using flow paths 224 including network data 225 and simulation data 230. The result of the RCCP analysis is RCCP data 228. In general, the RCCP analysis may be performed to determine an estimate of production that should be generated in order to meet simulated demand. Flow paths 224, when provided to RCCP solver 212, may include simulation data 230. In such cases, solving flow paths 224 to generate RCCP data 228 may be considered solving a simulation based on constraints of the simulation, which is traversed bottom to top to determine a scenario most likely to meet the business objectives of supply chain network 110.

Upsert module 214 performs upserting of database 114 based on RCCP data 228. For example, upsert module 214 may update a corresponding entry in database 114 if such an entry exists, or may insert a new entry in database 114 if no corresponding entry exists. In embodiments, upsert module 214 also provides RCCP data 228 to event hub 210 so that simulation data 230 may be generated.

User interface module 216 provides interactive graphical elements comprising selectable elements that, in response to a user selection, initiate a predetermined action, such as, for example, selecting a simulation generated by RCCP solver 212 and initiate incremental planning of one or more scenarios, persisting planned scenario to database 114, and other like actions, as described herein. In addition, user interface module 216 generates a user interface for selecting, visualizing, modifying, saving, and/or deleting one or more of: transaction data 218, base plan 220, dataframe 222, flow paths 224, network data 225, RCCP data 228, simulation data 230, demand data 232, inventory data 234, supply chain models 236, and inventory policies 238, and the like. The user interface may display one or more visual elements on an associated display device including for example, data, data models, product images, attributes and attribute values, selectable time periods, and the like. In addition, the user interface displays data and interactive visual elements for selecting and configuring scenarios and plans of supply chain planner 110.

Database 114 of supply chain planner 110 may comprise one or more databases 114 or other data storage arrangement at one or more locations, local to, or remote from, server 112. Database 114 comprises, for example, transaction data 218, base plan 220, dataframe 222, flow paths 224, network data 225, RCCP data 228, simulation data 230, demand data 232, inventory data 234, supply chain models 236, and inventory policies 238. Although database 114 is shown and described as comprising transaction data 218, base plan 220, dataframe 222, flow paths 224, network data 225, RCCP data 228, simulation data 230, demand data 232, inventory data 234, supply chain models 236, and inventory policies 238, embodiments contemplate any suitable number or combination of these at one or more locations, local to, or remote from, supply chain planner 110 according to particular needs.

Transaction data 218 comprises data associated with supply chain network 100 corresponding to transactions of supply chain network 100. Transaction data 218 may include sourcing data, network data, BOM data, ProductionMethod data, CustOrder data, or FcstOrder data.

Base plan 220 comprises a base supply chain plan generated by solver 204. For example, base plan 220 may comprise various plans for raw material distribution, manufacturing, storage, transportation or any other supply chain activity comprising actions from pre-production to retailing. Base plan 220 may be batched to generated transaction tables, which may be stored as transaction data 218.

Dataframe 222 comprises data which has been denormalized by denormalization module 206. Dataframe 222 may include a set of nodes of a supply chain model, as well as a set of edges of a supply chain model, stored as separate objects. Dataframe 222 may be used to generate flow paths 224, by combining the set of nodes and the set of edges into a complete network model.

Flow paths 224 comprise paths through network graphs of supply chain network 100 generated by prep module 208. In embodiments, flow paths 224 may by used by RCCP solver 212 to generate scenarios for supply chain network 100, as described in further detail below.

Network data 226 comprises data of a supply chain model. Network data 226 may comprise various nodes and edges associated with the supply chain model. For example, and as described in further detail below, a node of network data 226 may correspond to a particular distribution center or a particular retailer of supply chain network 100, while an edge of network data 226 may correspond to the connection between the distribution center and the retailer.

RCCP data 228 comprises solved RCCP data, such as supply chain scenarios. For example, when performing an RCCP analysis, RCCP data 228 may comprise a set of scenarios analyzed by RCCP solver 212 ranked by a particular metric, such as total revenue or any other relevant metric. That is, RCCP data 228 may comprise the result of many hundreds or thousands of simulations indicating which supply chain scenarios are most likely to result in completion of business objectives of supply chain network 100.

Simulation data 230 comprises various levers or adjustments made to supply chain data to determine the likely results from adjusting the levers. For example, an increase to production at a particular factory may be a lever used to generate a simulation, by simulating the likely impact on supply within the supply chain network. Other levers of simulation data 230 may include adjustments to raw material availability, product demand, transportation costs or any other metric bearing on the output of supply chain network 100.

Demand data 218 may comprise, for example, any data relating to past sales, past demand, purchase data, promotions, events, or the like of one or more supply chain entities 150. Demand data 218 may cover a time interval such as, for example, by the minute, hour, daily, weekly, monthly, quarterly, yearly, or any suitable time interval, including substantially in real time. According to embodiments, demand data 218 may include historical demand and sales data or projected demand forecasts for one or more retail locations, customers, regions, or the like of one or more supply chain entities 150 and may include historical or forecast demand and sales segmented according to product attributes, customers, regions, or the like.

Inventory data 220 may comprise any data relating to current or projected inventory quantities or states, order rules, or the like. For example, inventory data 220 may comprise the current level of inventory for each item at one or more stocking locations across supply chain network 100. In addition, inventory data 220 may comprise order rules that describe one or more rules or limits on setting an inventory policy, including, but not limited to, a minimum order quantity, a maximum order quantity, a discount, a step-size order quantity, and batch quantity rules. According to some embodiments, supply chain planner 110 accesses and stores inventory data 220 in database 114, which may be used by supply chain planner 110 to place orders, set inventory levels at one or more stocking points, initiate manufacturing of one or more items (or components of one or more items), or the like. In addition, or as an alternative, inventory data 220 may be updated by receiving current item quantities, mappings, or locations from inventory system 120, transportation management system 130, one or more imaging devices 140, and/or one or more supply chain entities 150.

Supply chain models 222 may comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). Additionally, or in the alternative, supply chain models 222 may comprise characteristics that specify the supply chain structure in even more detail, including, for example, specifying the type of collaboration with the customer (e.g. Vendor-Managed Inventory (VMI)), from which stocking locations or suppliers items may be sourced, customer priorities, demand priorities, how products may be allocated, shipped, or paid for, by particular customers, and the destination stocking locations or one or more supply chain entities 150 where items may be transported. Each of these characteristics may lead to different supply chain models 222.

Inventory policies 224 may comprise any suitable inventory policy describing the reorder point and target quantity, or other inventory policy parameters that set rules for supply chain planner 110 to manage and reorder inventory. Inventory policies 224 may be based on target service level, demand, cost, fill rate, or the like. According to embodiment, inventory policies 224 comprise target service levels that ensure that a service level of one or more supply chain entities 150 is met with a certain probability. For example, one or more supply chain entities 150 may set a target service level at 95%, meaning one or more supply chain entities 150 will set the desired inventory stock level at a level that meets demand 95% of the time. Although, a particular target service level and percentage is described; embodiments contemplate any target service level, for example, a target service level of approximately 99% through 90%, 75%, or any target service level, according to particular needs. Other types of service levels associated with inventory quantity or order quantity may comprise, but are not limited to, a maximum expected backlog and a fulfillment level. Once the service level is set, supply chain planner 110 may determine a replenishment order according to one or more replenishment rules, which, among other things, indicates to one or more supply chain entities 150 to determine or receive inventory to replace the depleted inventory.

Figure 3:
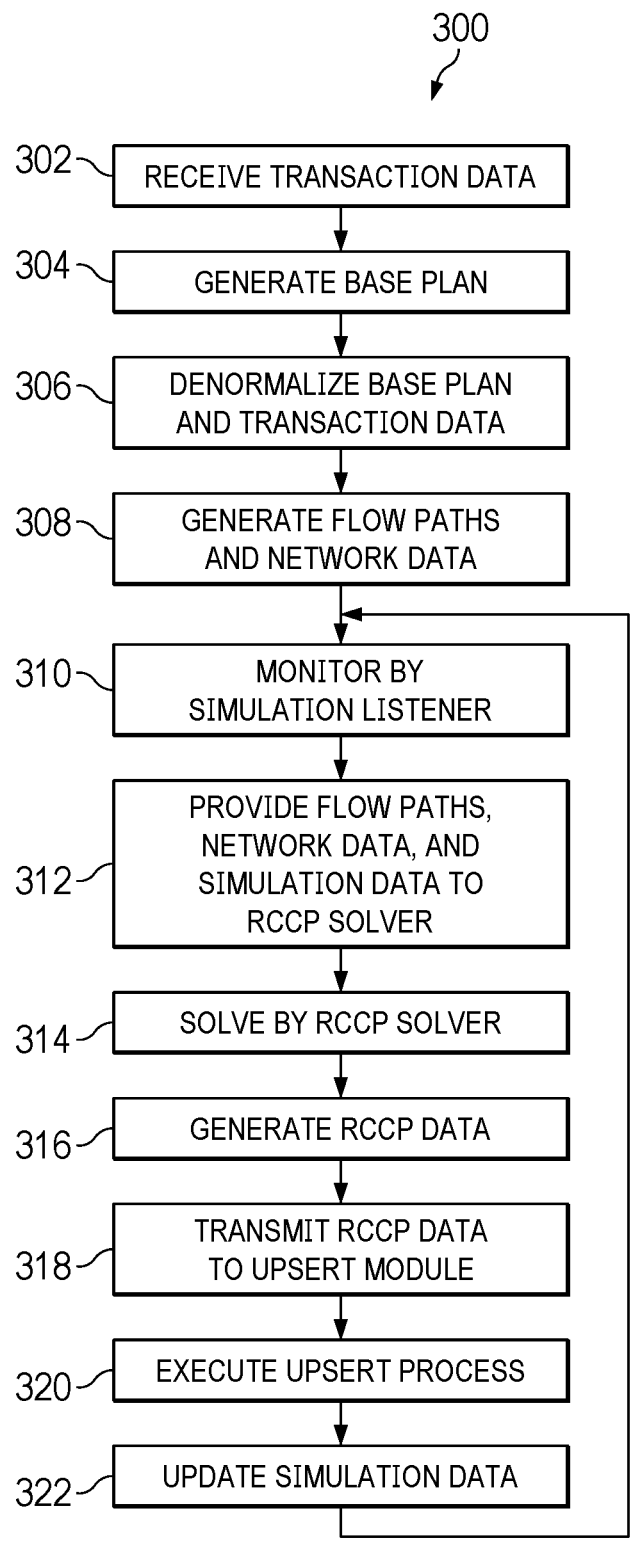
FIG. 3 illustrates a rough cut capacity planning (RCCP) method, according to an embodiment.

FIG. 3 illustrates RCCP method 300, according to an embodiment. RCCP method 300 comprises one or more activities, which although described in a particular order, may be performed in one or more permutations according to particular needs.

At activity 302, supply chain planner 110 receives transaction data 218. According to embodiments, supply chain planner 110 receives transaction data 218 from database 114, one or more supply chain entities 150, and/or one or more locations local to, or remote from, supply chain network 100. By way of example only and not by way of limitation, RCCP method 300 is described in connection with example workflow 400 of FIG. 4. At activity 302, transaction data 218 is received as transaction tables 410 by modeler 202 in base plan batch process 402.

At activity 304, supply chain planner 110 generates base plan 220. As disclosed above, modeler 202 generates a supply chain model representing a supply chain problem, and solver 204 solves the supply chain problem to generate a supply chain plan comprising base plan 220. Continuing with the previous example, base plan 220 is generated during base plan batch process 402 and generates updated transaction tables 412. By way of example and not by way of limitation, base plan batch process 402 prepares transaction tables 412 for a demand perturbation scenario or a network perturbation scenario for RCCP preparation 404.

At activity 306, denormalization module 206 performs denormalization on base plan 220 and transaction data 218. Continuing with the example of RCCP workflow 400, denormalization module 206 receives updated transaction tables 412 to generate dataframe 222 in RCCP preparation 404. According to an embodiment, denormalization module 204 may perform a denormalization process such as database management system (DBMS) support, database administrator (DBA) implementation, or other suitable denormalization process.

At activity 308, modeler 202 generates flow paths 224 and network data 226 based at least in part on dataframe 222. In the example of RCCP workflow 400, prep module 208 generates flow paths 224 with network 226 from dataframe 222, in RCCP preparation 404.

At activity 310, prep module 208 monitors flow paths 224, network data 226, and simulation data 230. As described in greater detail below, prep module 208 monitors data during RCCP method 300, providing for iterative simulations. Continuing with the previous example, prep module 208 receives flow paths 224 and network data 226 while monitoring for simulation data 230, in RCCP preparation 404.

At activity 312, prep module 208 provides flow paths 224, network data 226, and simulation data 230 to RCCP solver 212. In the RCCP workflow 400 example, prep module 208 provides flow paths 224, network data 226, and simulation data 230, to RCCP solver 212 of RCCP serverless compute 406. When simulation data 230 is not available, such as on the first iteration of an iterative simulation, prep module 208 may provide flow paths 224 solely based on network data 226 as an alternative. In addition, or as an alternative, prep module 208 provides flow paths 224, network data 226, and simulation data 230 from RCCP serverless compute 406 to database 114 and/or event hub 210.

At activity 314, RCCP solver 212 solves the data received from simulation listener 208. Continuing with the RCCP workflow 400 example, RCCP solver 212 solves the data received from simulation listener 208, in RCCP serverless compute 406. According to an embodiment, RCCP solver 212 traverses supply chain network 100 in a reverse manner. Although RCCP solver 210 is shown and described as residing in server 112, embodiments contemplate RCCP solver 210 residing solely in memory associated with one or more computers 160 at one or more locations local to or remote from supply chain network 100.

At activity 316, RCCP solver 212 generates RCCP data 228. In the RCCP workflow 400 example, RCCP solver 212 generates RCCP data 228, in RCCP serverless compute 406.

At activity 318, RCCP solver 212 transmits RCCP data 228 to upsert module 214. Continuing with the previous example, RCCP solver 212 transmits RCCP data 228 to upsert module 214 of upserter service 408. In addition, or as an alternative, RCCP solver 212 transmits RCCP data 228 to event hub 210.

Figure 10:
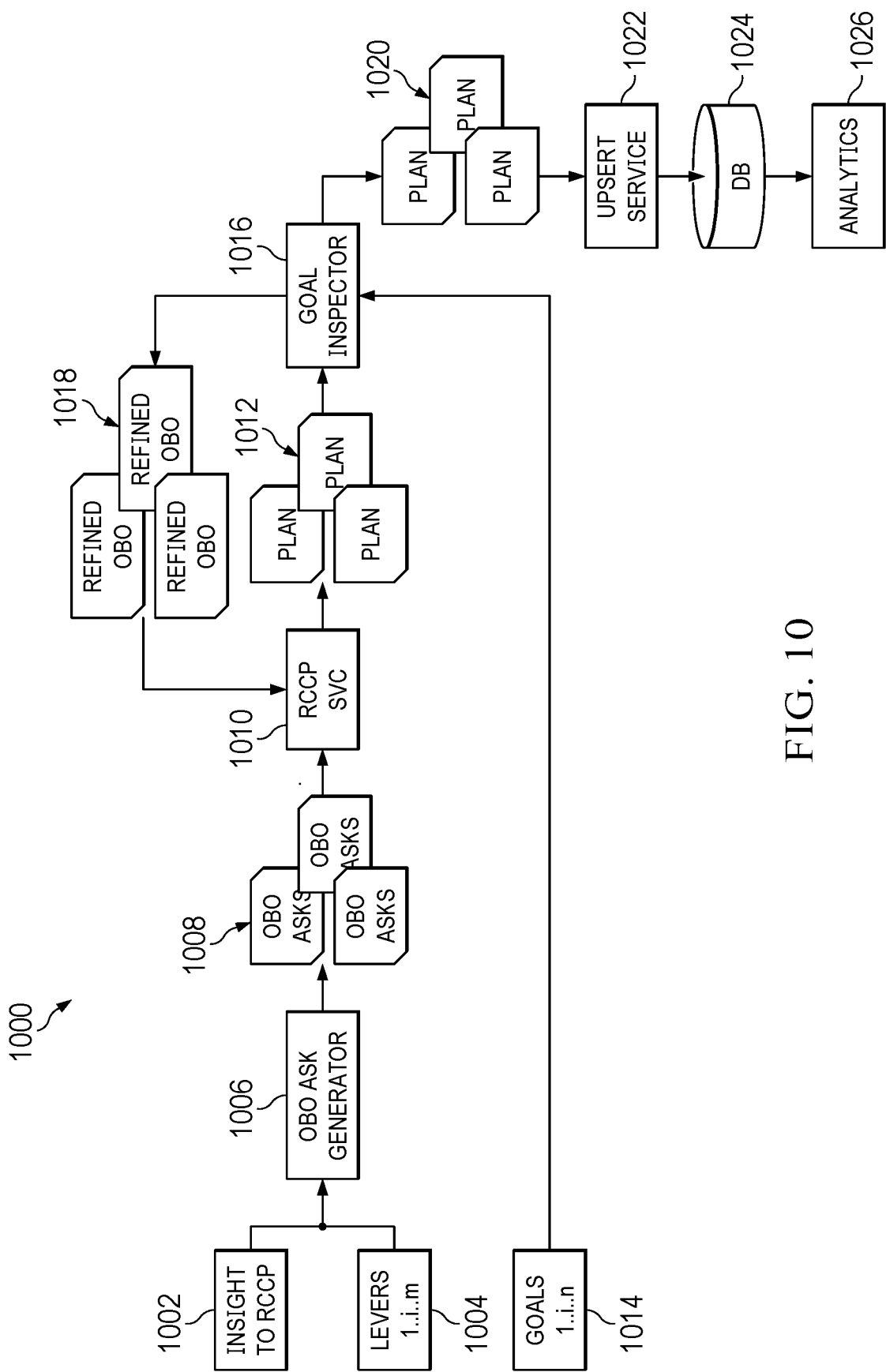
FIG. 10 illustrates a map-reduce type approach for the RCCP method of FIG. 3, according to an embodiment.

At activity 320, upsert module 214 executes upsert process on RCCP data 228. In the example of RCCP workflow 400, upserter module 214 executes upsert process in upserter service 408. Continuing this example, upserter service 408 executes and transmits RCCP simulation finish event to event hub 210, as shown in FIG. 10. In addition, or as an alternative, upserter service 408 updates database 114.

At activity 322, upsert module 214 updates simulation data 230. Continuing with the RCCP workflow 400 example, upsert module 214 updates simulation data 230, which is received by simulation listener 208, as described above with activity 310.

Figure 4:
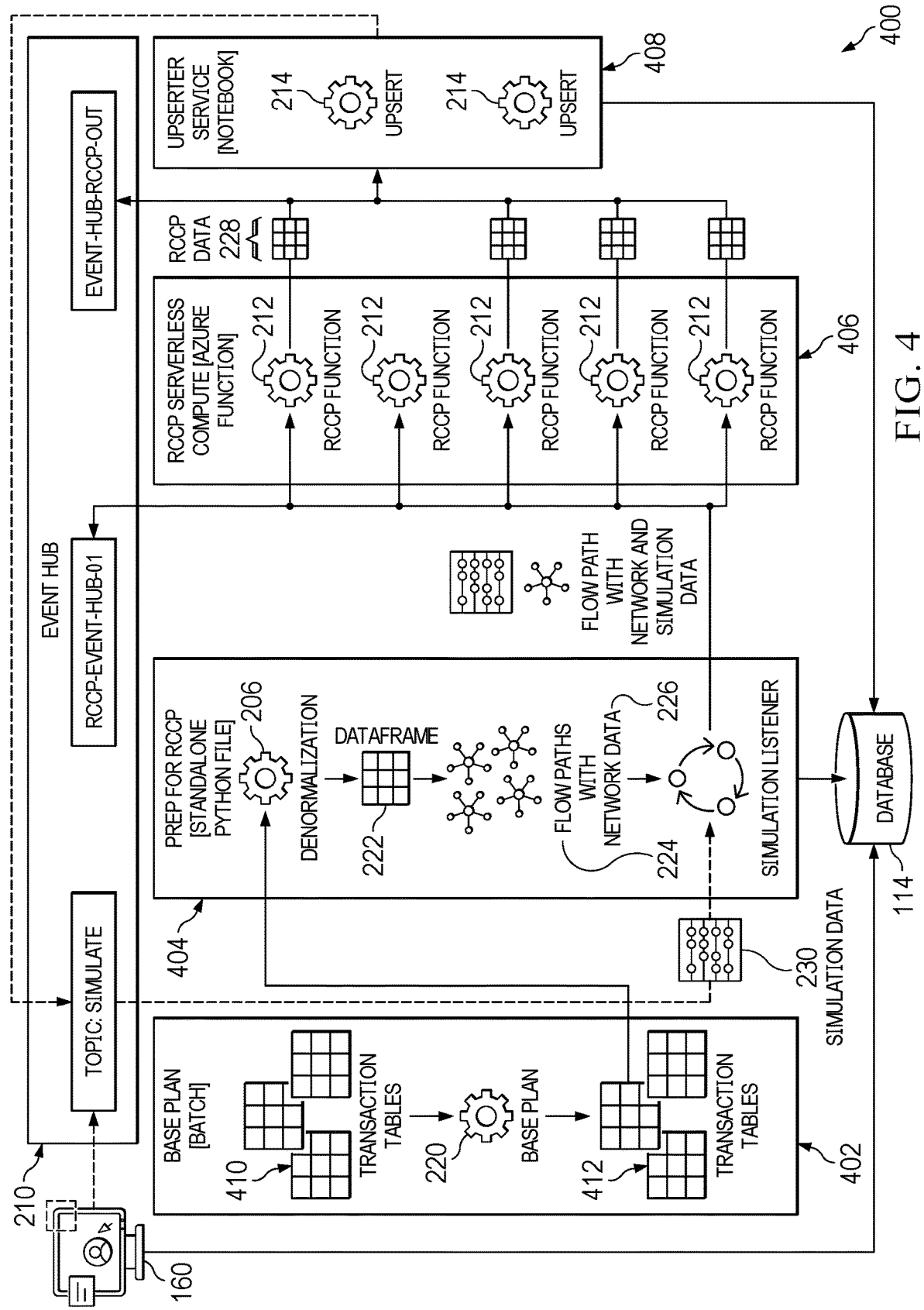
FIG. 4 illustrates a RCCP workflow, according to an embodiment.

FIG. 4 illustrates RCCP workflow 400, according to an embodiment. RCCP workflow 400 comprises base plan batch process 402, RCCP preparation 404, RCCP serverless compute 406, and upserter service 408. As shown, RCCP workflow 400 may be initiated by computer 160 executing a GUI. Computer 160 may initiate a simulation within event hub 210. In embodiments, computer 160 may be used to directly update the data of database 114.

At base plan batch process 402, transaction tables 410 are processed by abase plan function to generate updated transaction tables 412. Transaction tables 412 may be provided to RCCP preparation 404, as performed by prep module 208. Within RCCP preparation 404, denormalization module 206 performs denormalization to generate dataframe 222. Then, prep module 208 uses dataframe 222 to generate flow paths 224. Flow paths 224 include network data 226 comprising data of a graph model used to model supply chain network 110. RCCP preparation 404 may also include a simulation listener configured to continuously listen for simulation data 230 received from event hub 210. In embodiments, such as a first run of an iterative simulation process, simulation listener may provide flow paths 224 to event hub 210 and RCCP serverless compute 406. In other embodiments, the simulation listener may combine flow paths 224 with simulation data 230, and pass the combined flow paths 224 to event hub 210 and RCCP serverless compute 406. During RCCP preparation 404, prep module 208 may also update database 114 with flowpaths 224 or simulation data 230.

At RCCP serverless compute 206, one or more RCCP solvers 212 use flow paths 224, with or without simulation data 230 as described above, to generate one or more scenario results as RCCP data 228. RCCP data 228 may be provide to upserter service 408 as well as event hub 210. Upserter service 408 may store RCCP data 228 in database 114 as appropriate and may also provide RCCP data 228 to event hub 210. Event hub 210 correlates the various data from computer 160, prep module 208 and upserter service 408 to generate simulation data 230. For example, computer 160 may transmit specified changes to levers received as input to event hub 210, and event hub 210 may thereafter provide to changes to the levers as simulation data 230.

Figure 5:
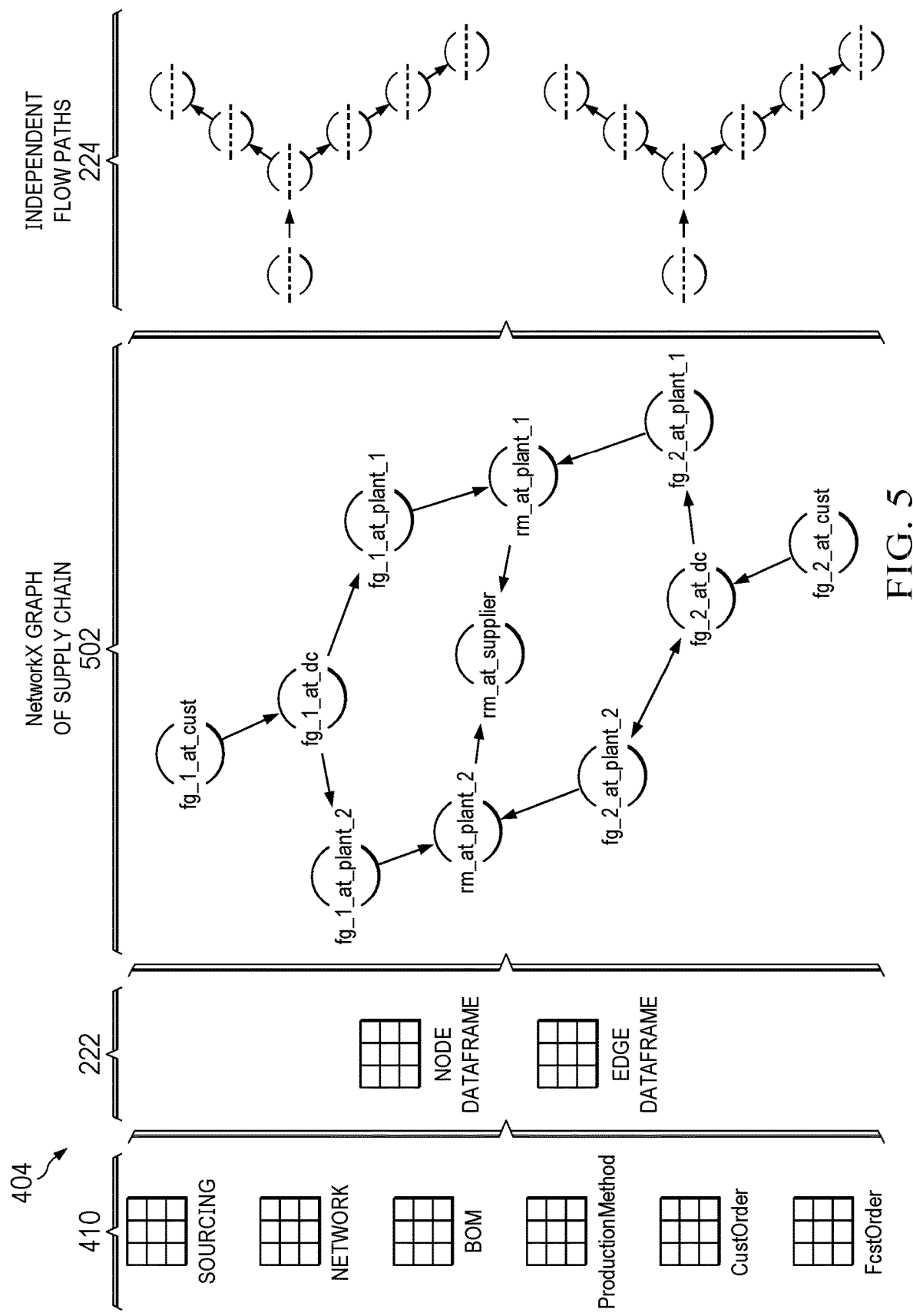
FIG. 5 illustrates a RCCP preparation, according to an embodiment.

FIG. 5 illustrates RCCP preparation 404, according to an embodiment. RCCP preparation 404 processes transaction tables 410 and dataframes 222 in sixteen seconds for example data of a paint manufacturer on a laptop computer with sixteen gigabytes of memory. Continuing with this example, RCCP preparation 404 processes dataframes 222 into network graph of supply chain 502, and processes network graph of supply chain 502 into independent flow paths 224 in fifty two seconds.

Transaction tables 410 may include various data tables, such as a sourcing table or a network table, as illustrated. Transaction tables 410 may be combined by prep module 208 to generate dataframe 222, comprising a node dataframe and an edge dataframe. Prep module 208 may thereafter use dataframe 222 to generate a complete network graph of supply chain network 100, illustrated as network graph of supply chain 502. Independent flow paths 224 represent particular end-to-end traversals of network graph of supply chain 502. For example, every possible path from first node to an ending node may be stored as independent flow paths 224.

Figure 6:
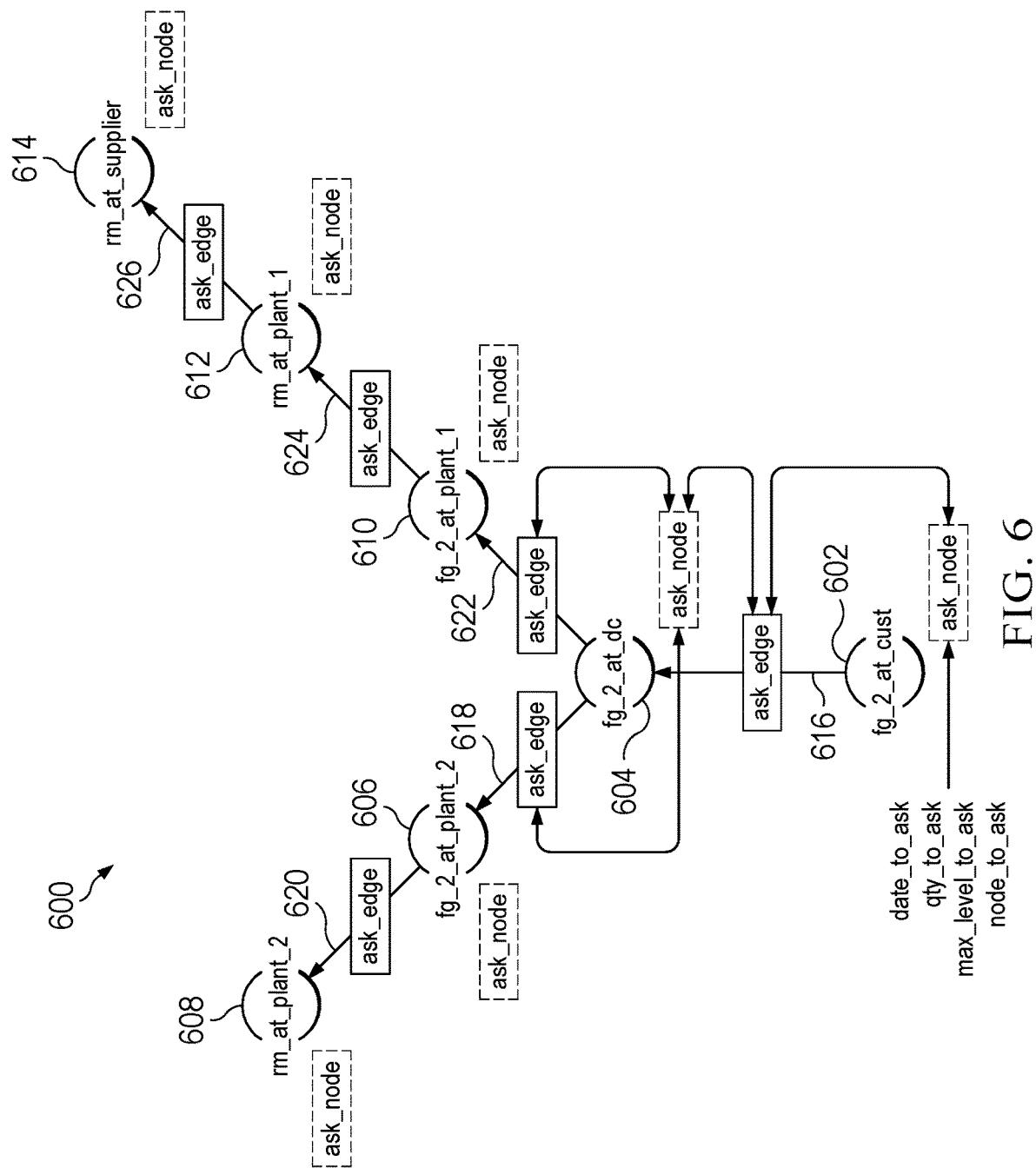
FIG. 6 illustrates a RCCP core logic, according to an embodiment.

FIG. 6 illustrates RCCP core logic 600, according to an embodiment. RCCP core logic 600 traverses flow paths 222 at each node and each edge. Flow paths 222 comprise a network of nodes 602-614 connected by edges 616-626. According to embodiments, RCCP solver 212 performs the ask_node process by checking for available material, and when not available, performing the ask_edge process on the upstream edges, waiting for return of ask_node process, and returning extra material needed. RCCP solver 212 performs the ask_edge process by checking for lead time, finding source node with lead time, performing the ask node process on source node, and returning the results from upstream. Embodiments contemplate that RCCP core logic 600 considers rule based sourcing, proportional sourcing, push based planning, and the like.

As an example, node 602 corresponds to the inventory availability for a particular finished good (fg_2) at a customer, represented as fg_2_at_cust. In order to determine the demand for fg_2, RCCP solver 212 performs the ask_node process at fg_2_at_cust. Because the demand is not yet calculated, the ask_node process calls the ask_edge process for edge 616. The ask_edge process for edge 616 calls the ask_node process of its source node, in this case node 604, corresponding to the inventory of fg_2 at a particular distribution center, represented as fg_2_at_dc. The ask_node and ask_edge processes continue to call each other in this fashion until the end of the flow path is reached. In this example, the final node is either raw material availability at plant 2 (rm_at_plant_2 of node 608) or the raw material availability at a supplier (rm_at supplier of node 614). In either case, RCCP solver 212 determines the raw material availability, and then calculates backwards back to node 602, in order to determine the estimated inventory availability of fg_2 to the customer.

FIG. 7 illustrates performance data 700 of RCCP method 300, according to an embodiment. Performance data 700 comprises a chart showing the total time in milliseconds (Time_Taken) for various combinations of ask levels (Levels_To_Ask) and simulation quantities (Num_Simulatirons). Result 702 indicates that even for sixteen ask levels and one thousand simulations, the time taken is approximately 2028 milliseconds. Embodiments contemplate running one thousand simulations in less than 0.5 seconds when running RCCP method 300 in parallel.

Figure 8:
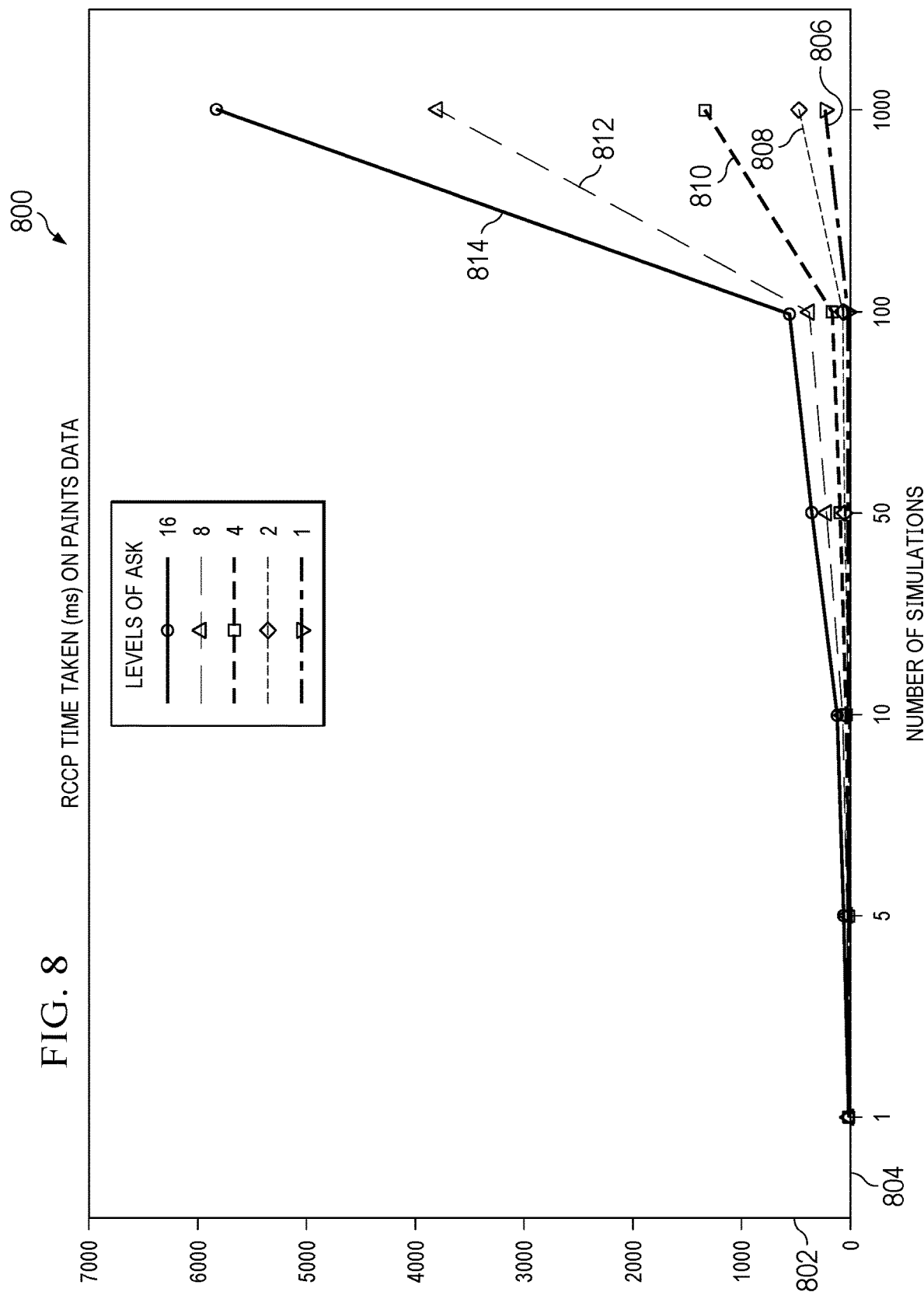
FIG. 8 illustrates a performance chart, according to an embodiment.

FIG. 8 illustrates performance chart 800, according to an embodiment. Chart 800 shows total time (y-axis 802) for various quantities of simulations (x-axis 804) and various quantities of ask levels (one level 806, two level 808, four level 810, eight level 812, and sixteen level 814).

FIG. 9 illustrates example chart 900 of RCCP data 228, according to an embodiment. Chart 900 shows results of RCCP solving the plan using RCCP method 300. According to embodiments, KPIs and BSC are derived from RCCP data 228, such as, for example, total cost to serve, total manufacturing cost, total transportation cost, total procurement cost, total revenue, total profit, and the like.

FIG. 10 illustrates a map-reduce type approach 1000 for RCCP method 300, according to an embodiment. Map-reduce type approach 1000 comprises iterative steps allowing for the fulfillment of business objectives to be completed. Map-reduce type approach 1000 states with insights to RCCP 1002 and various levers 1 through m 1004 being provided to an OBO ask generator 1006. OBO ask generator 1006 generates various OBO asks 1008. OBO asks 1008 can be provided to RCCP service 1010, such as RCCP solver 212, in order for OBO asks 1008 to be solved. The solutions produced by RCCP service 1010 are plans 1012.

Plans 1012 may be analyzed by goal inspector 1016. Goal inspector 1016 may determine, if the goals defined in OBO asks 1008 have not been sufficiently achieved, such as by failing to meet a certain success threshold, to refine one or more of plans 1012 to generated refined OBO 1018. Refined OBO 1018 may be provided to RCCP service 1010 for refined OBO 1018 to be solved to produce plans 1012 once more. This loop can be iteratively repeated until goal inspector 1016 determines the business goals have been sufficiently achieved. In embodiments, additional Goals 1 through n 1014 may be provided to goal inspector 1016 to add on to the requirements for solving refined OBO 1018.

Once goal inspector 1016 determines plans 1012 have sufficiently achieved the goals as defined in OBO asks 1008 or goals 1 through n 1014, goal inspector 1016 can pass solved plans 1020 to upsert service 1022. Upsert service 1022 may then sent plans 1020 to database 1024 which may also be called a persistence layer. Plans 1020 may thereafter be used to perform various analytics at 1026, at which point map-reduce type approach 1000 ends.

Embodiments provide for an iterative technique to inspect the business objectives, and keep iterating until the results are closer to the goals. In addition, or as an alternative, once embodiments got closer to the goals, then the simulations are stopped, and it is sent to a persistence layer to build meaningful analytics.

FIG. 11 illustrates user interface 1100, according to an embodiment. User interface 1100 may be generated by user interface module 218 of supply chain planner 110. User interface 1100 comprises various panes and windows indicating data related to scenarios generated by supply chain planner 110. In this example, a top pane of user interface 1100 defines a risk within the supply chain planning solution of "Shift in consumer buying behavior to low grammage products," with a confidence level of 86%.

A lower pane of user interface 1100 lays out various scenarios that may be selected by a user interacting with user interface 1100. As shown, the scenarios of the lower pane have been optimized by "Margin MAX" and "Demand Met MAX." Scenario 1 1102 is shown as a recommended scenario of 3 generated scenarios compared to a current plan. Each of the three scenarios, as well as the current plan, show a projected revenue, a projected gross profit margin, and a projected service level. As shown, scenario 1 1102 projects an improvement, compared to the current plan, in revenue and gross profit margin, while maintaining the projected cost to serve and the projected service level. User interface 1100 includes an "Accept" button underneath scenario 1, allowing a user to select scenario 1 for implementation.

Figure 12:
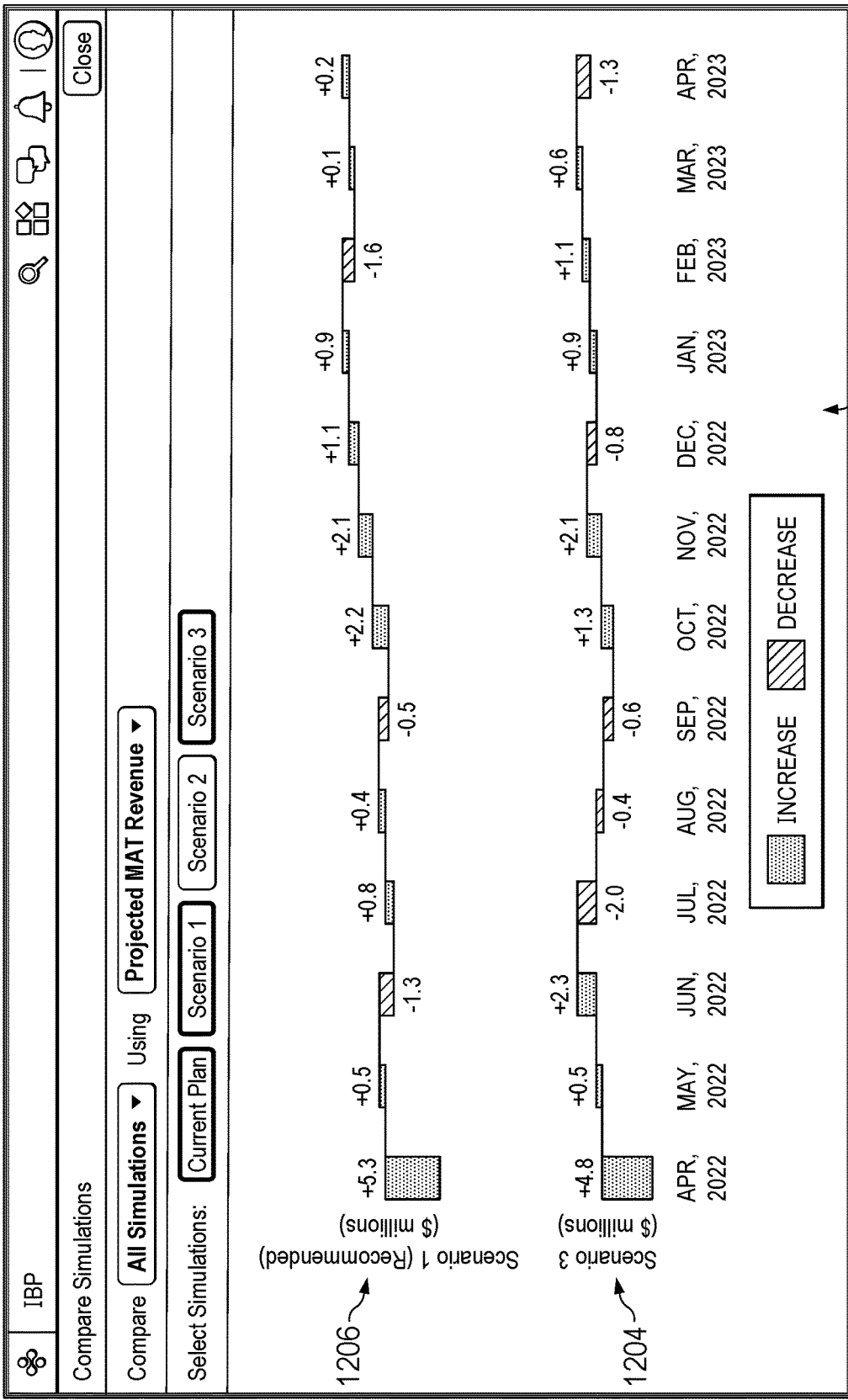
FIG. 12 illustrates a second user interface, according to an embodiment.

FIG. 12 illustrates user interface 1200, according to an embodiment. User interface 1200 shows a comparison of scenario 3 1204 and scenario 1 1206 for various time periods 1202. Scenarios 1204 and 1206 have been compared according to "Projected MAT revenue." As shown by the buttons at the top of user interface 1200, a user may select to compare scenario 1, scenario 2 or scenario 3 against the current plan, while including or excluding any individual scenario. The user also may select to compare the scenarios to the current plan according to other metrics via the drop down menu, such as revenue, gross profit margin, cost to serve, service level, or any other relevant metric.

Figure 13:
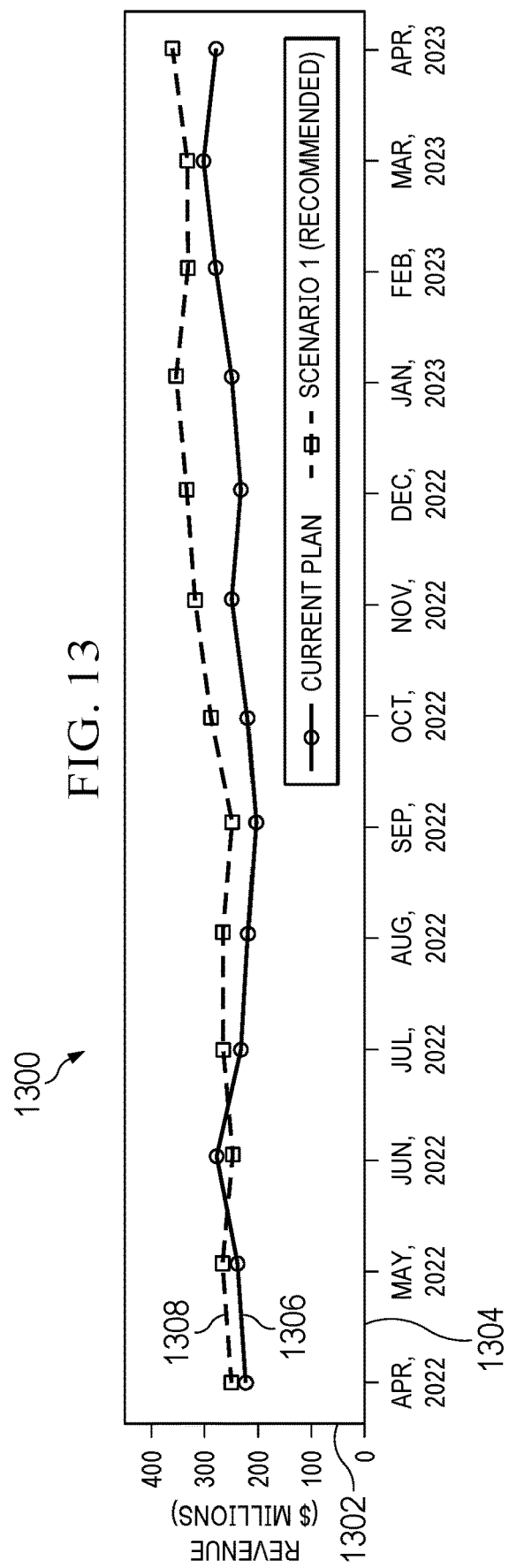
FIG. 13 illustrates an example comparison chart, according to an embodiment.

FIG. 13 illustrates example comparison chart 1300, according to an embodiment. Chart 1300 shows a comparison of revenue (y-axis 1302) for various time periods (x-axis 1304) for current plan 1306 and recommended scenario 1308. In addition, or as an alternative, embodiments provide for several other ways of comparing the results, as shown in the above figure. As these scenarios are run, this output is displayed on a graphical user interface.

Embodiments provide for an exemplary use case for a potato chips company. As an example only and not by way of limitation, consider the following example to demonstrate the operation of the systems and methods described above. Assume there is a food plant that is producing potato chips and bagging them into a first bag size, and a second, smaller, bag size, before they are shipped into a distribution network. In this example, one challenge is that consumer buying behavior has shifted to favor smaller size bag keeping units (SKUs), although the larger bag SKUs are being stocked. Continuing with this example, the demand for the larger sized bags has decreased but are still being produced, because of the way the supply chain is configured. That is, once the potato chips come out of the fryer, they have to be bagged into either the large or smaller sized SKUs. In this example, although there is reduced demand for larger size bag, they are still being produced and shipped into the distribution network at the same rate. Once in the network, the larger size bags may be placed in inventory without significant sales, leading to eventual waste of the products. On the other hand, the smaller bag SKUs, where the demand has increased due to the change in consumer buying behavior, the food plant is barely able to keep up with the demand, and customer service becomes a problem.

In addition, or as an alternative, there is a related contract risk in this example, where all the manufacturing is happening at a contract manufacturer. That is, the contract manufacturer has been promised with a certain volume across these larger and smaller size bag SKUs, so a simple solution of producing less of the larger size bag would likely violate the contract.

In terms of input variables, embodiments allow perturbations of levers in this kind of use case, which will have a positive impact on the demand. Likewise offering some discounts or other promotions may have a result of increasing demand for the larger size bag, which will allow for the depletion of some of the inventory that is being built up. Other levers could be, for example, to make less potato chips, so then there will be less to bag and then less to ship. Another lever to look at may be to change some of the larger size bag lines to smaller size bag lines. According to embodiments, these may be the input variables where there does not need to specify what those exact levers are, or those exact impacts are. Rather, a user may specify the levers and embodiments automatically respond with what the best outcome is.

As an example only and not by way of limitation, consider the following further examples to demonstrate the use of the systems and methods described above. A demand planner may use embodiments in order to fulfill his primary goal, which may be, for example, to develop driver-based monthly volume forecasts for products within supply chain network 100. When performing demand planning related tasks, embodiments may use supply chain planner 110 to generate driver-based forecasts and identify demand shifts and related obsolescence risk resulting from such shifts for certain SKUs, (such as SKUs above a certain weight threshold.) A demand planner can raise a potential risk manually and request for input from the sales and marketing team to mitigate the risk. In such a situation, embodiments provide end to end workflow tracking for timely decision making.

A marketing lead, a sales lead or a category lead may use embodiments in order to fulfill their primary goals, which may be, for example, to review and refine market demand assumptions within supply chain network 100. These roles may participate in a variety of activities which are all grouped under the umbrella of demand review. For example, during demand review, a marketing lead may review category performance against a target and identify changes in demand shift, a sales lead may conduct pricing and promotion analysis with a, for example, net revenue management (NRM) team to assess the need to add or remove any promotions, pricing, etc. specific to these packs, and a category lead for a product analyzes the impact of demand shift in the plan and against the overall financial targets/metrics (e.g., revenue, margin) and prioritizes the mitigation of revenue risks. Also during demand review, a demand planner may create requisite simulations using embodiments, using pricing or promotion levers suggested by embodiments, to increase the demand for certain products along with their associated financial impacts. Finally, during demand review, a supply chain director and supply planner may be invited to help with the mitigation options. Embodiments may be used during demand review to provide end to end workflow tracking for timely decision making.

A supply chain director may use embodiments in order to fulfill his primary goal, for example, to evaluate supply options along with financial and business impact and decide trade offs. A supply chain director, during supply review, may use embedded analytics to articulate the product mix impact and call out additional impacts, such as a shift in bottlenecks within supply chain network 100 or risks of not meeting contractual obligations with third party manufacturers. The supply chain director may also suggest strategies around controlling technology throughout to balance between excess of certain products and shift towards alternative products. A supply chain planner may use guidance from the supply chain director and use embodiments to prepare requisite simulations with cost benefit analysis, projected customer service level basis, planned utilization ranges and inventory (min or max) levels. The supply chain director may pick a preferred option from the output of the simulations and decide to bubble up the decision for visibility to executives Supply chain executives may use embodiments in order to fulfill their primary goals, for example, to review and sign off on updated business plans. A supply chain executive, during management business review, may review the decisions taken by lower level employees and approve the business plan, and may also communicate the plan to stakeholders. The supply chain executive may use embodiments to provide end to end workflow tracking for timely decision making, as well as to allow management to review decisions taken in the next cycle.

Reference in the foregoing specification to "one embodiment", "an embodiment", or "some embodiments" means that a particular factor, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system for performing rough cut capacity planning through iterative simulation, comprising:
   a supply chain network comprising two or more supply chain entities modelled as a set of nodes and edges;
   a computer coupled with a database and comprising a processor and memory, the computer configured to:
      receive supply chain transaction data as transaction tables;
      generate a base plan;
      generate updated transaction tables;
      denormalize the base plan and the updated transaction tables;
      generate supply chain network flow paths and supply chain network data;
      solve a rough cut capacity planning problem based at least in part on the supply chain network flow paths, the supply chain network data and simulation data;
      repeat at least the generate supply chain network flow paths and supply chain network data and the solve the rough cut capacity planning problem until business goals of the rough cut capacity planning meet a threshold; and
      update the simulation data based on an upsert process; and
   automated robotic production machinery configured to:
      produce one or more products based, at least in part, on the solution to the rough cut capacity planning problem.

2. The system of claim 1, wherein the computer is further configured to:
   denormalize the updated transaction tables by adding redundant data to transaction data to improve a read performance of the transaction data.

3. The system of claim 1, wherein the upsert process further comprises:
   update a corresponding entry in the database; and
   in response to the corresponding entry not existing, insert a new entry into the database.

4. The system of claim 1, wherein the supply chain network flow paths and the supply chain network data are generated at least in part based on a dataframe, the dataframe comprising a set of the nodes and edges of the supply chain network, the denormalized base plan and the denormalized updated transaction tables.

5. The system of claim 1, wherein the computer is further configured to:
   relax one or more supply chain network constraints;
   invert the supply chain network of nodes and edges; and
   traverse a perturbation in the one or more supply chain network constraints as one or more demands in a reverse direction towards one or more customer nodes.

6. The system of claim 1, wherein the computer is further configured to:
   determine one or more estimates of production in order to meet one or more simulated demands.

7. The system of claim 1, wherein the rough cut capacity planning comprises one or more planning scenarios.

8. A computer-implemented method for performing rough cut capacity planning through iterative simulation, comprising:
   receiving, by a computer comprising a processor and memory and coupled to a database, supply chain transaction data as transaction tables;
   generating, by the computer, a base plan;
   generating, by the computer, updated transaction tables;
   denormalizing, by the computer, the base plan and the updated transaction tables;
   generating, by the computer, supply chain network flow paths and supply chain network data;
   solving, by the computer, a rough cut capacity planning problem based at least in part on the supply chain network flow paths, the supply chain network data and simulation data;
   repeating, by the computer, at least the generating supply chain network flow paths and supply chain network data and the solving the rough cut capacity planning problem until business goals of the rough cut capacity planning meet a threshold;
   updating, by the computer, the simulation data based on an upsert process; and
   producing, by automated robotic production machinery, one or more products based, at least in part, on the solution to the rough cut capacity planning problem.

9. The method of claim 8, further comprising:
   denormalizing, by the computer, the updated transaction tables by adding redundant data to transaction data to improve a read performance of the transaction data.

10. The method of claim 8, wherein the upsert process further comprises:
    updating, by the computer, a corresponding entry in the database; and
    in response to the corresponding entry not existing, inserting, by the computer, a new entry into the database.

11. The method of claim 8, wherein the supply chain network flow paths and the supply chain network data are generated at least in part based on a dataframe, the dataframe comprising a set of the nodes and edges of the supply chain network, the denormalized base plan and the denormalized updated transaction tables.

12. The method of claim 8, wherein performing the rough cut capacity planning (RCCP) further comprises:
    relaxing, by the computer, one or more supply chain network constraints;
    inverting, by the computer, the supply chain network of nodes and edges; and
    traversing, by the computer, a perturbation in the one or more supply chain network constraints as one or more demands in a reverse direction towards one or more customer nodes.

13. The method of claim 8, wherein performing the rough cut capacity planning (RCCP) further comprises:
    determining, by the computer, one or more estimates of production in order to meet one or more simulated demands.

14. The method of claim 8, wherein the rough cut capacity planning comprises one or more planning scenarios.

15. A non-transitory computer-readable storage medium embodied with software for performing rough cut capacity planning through iterative simulation, the software when executed by a computer comprising a processor and memory and coupled to a database, the software configured to:
    receive supply chain transaction data as transaction tables;

generate a base plan;

generate updated transaction tables;

denormalize the base plan and the updated transaction tables;

generate supply chain network flow paths and supply chain network data;

solve a rough cut capacity planning problem based at least in part on the supply chain network flow paths, the supply chain network data and simulation data;

repeat at least the generate supply chain network flow paths and supply chain network data and the solve the rough cut capacity planning problem until business goals of the rough cut capacity planning meet a threshold;

update the simulation data based on an upsert process; and produce, by automated robotic production machinery, one or more products based, at least in part, on the solution to the rough cut capacity planning problem.

16. The non-transitory computer-readable storage medium of claim 15, wherein the software when executed is further configured to:

denormalize the updated transaction tables by adding redundant data to transaction data to improve a read performance of the transaction data.

17. The non-transitory computer-readable storage medium of claim 15, wherein the upsert process further comprises:

update a corresponding entry in the database; and in response to the corresponding entry not existing, insert a new entry into the database.

18. The non-transitory computer-readable storage medium of claim 15, wherein the supply chain network flow paths and the supply chain network data are generated at least in part based on a dataframe, the dataframe comprising a set of the nodes and edges of the supply chain network, the denormalized base plan and the denormalized updated transaction tables.

19. The non-transitory computer-readable storage medium of claim 15, wherein the software when executed is further configured to:

relax one or more supply chain network constraints;

invert the supply chain network of nodes and edges; and traverse a perturbation in the one or more supply chain network constraints as one or more demands in a reverse direction towards one or more customer nodes.

20. The non-transitory computer-readable storage medium of claim 15, wherein the software when executed is further configured to determine one or more estimates of production in order to meet one or more simulated demands.

* * * * *